United States Patent
Blech

(10) Patent No.: US 8,565,347 B2
(45) Date of Patent: Oct. 22, 2013

(54) ANTENNA MEASUREMENT SYSTEM AND METHOD

(75) Inventor: Marcel Daniel Blech, Herrenberg (DE)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 13/250,311

(22) Filed: Sep. 30, 2011

(65) Prior Publication Data

US 2012/0082199 A1    Apr. 5, 2012

(30) Foreign Application Priority Data

Oct. 5, 2010   (EP) ..................................... 10186549

(51) Int. Cl.
*H03C 1/52*       (2006.01)
*H04L 27/04*    (2006.01)

(52) U.S. Cl.
USPC ......................................................... 375/300

(58) Field of Classification Search
USPC ......................................................... 375/300
See application file for complete search history.

(56) References Cited

U.S. PATENT DOCUMENTS

| 6,348,683 | B1 * | 2/2002 | Verghese et al. | 250/214.1 |
| 2008/0212974 | A1 | 9/2008 | Davies et al. | |
| 2010/0295725 | A1 * | 11/2010 | Krozer | 342/25 A |

FOREIGN PATENT DOCUMENTS

| WO | WO 2006/123163 | A1 | 11/2006 |
| WO | WO 2006123163 | A1 * | 11/2006 |

OTHER PUBLICATIONS

"IEEE Standard Test Procedures for Antennas", IEEE Standard 149-1976, Institute of Electrical and Electronics Engineers, 1979, 141 Pages.
M. M. Leibfritz et al., "A Comparison of Software—and Hardware-Gating Techniques Applied to Near-Field Antenna Measurements", Advances in Radio Science, vol. 5, 2007, pp. 43-48.
Marcel D. Blech et al., "Time-Domain Spherical Near-Field Antenna Measurement System Employing a Switched Continuous-Wave Hardware Gating Technique", IEEE Transactions on Instrumentation and Measurement, vol. 59, No. 2, Feb. 2010, pp. 387-395.

(Continued)

*Primary Examiner* — Siu Lee
*Assistant Examiner* — Tanmay Shah
(74) *Attorney, Agent, or Firm* — Oblon, Spivak, McClelland, Maier & Neustadt, L.L.P.

(57) ABSTRACT

The present invention relates to an antenna measurement system and a corresponding method for measuring parameters of the transfer function of an antenna transmission system comprising a transmit antenna, a receive antenna and a transmission channel between said transmit antenna and said receive antenna, and/or for measuring parameters of an antenna of said antenna transmission system. In order to enable such a measurement for a single discrete frequency at high frequencies as used in mm-wave applications, an antenna measurement system is proposed comprising mixers, for frequency conversion on the transmitter side and detection on the receiver side, which are both driven by an electromagnetic radiation signal. Applying a switched DC signal for biasing the mixer on the transmitter side with an ultra-fast rise-time, the envelope of the time domain signal can directly be measured in the time domain on the receiver side.

18 Claims, 5 Drawing Sheets

(56) References Cited

OTHER PUBLICATIONS

E. R. Brown et al., "Coherent Millimeter-Wave Generation by Heterodyne Conversion in Low-Temperature-Grown GaAs Photoconductors", Journal of Applied Physics, vol. 73, No. 3, Feb. 1, 1993, pp. 1480-1484.

Kyoji Shibuya et al., "Compact and Inexpensive Continuous-Wave Subterahertz Imaging System with a Fiber-Coupled Multimode Laser Diode", Applied Physics Letters, vol. 90, No. 161127, 2007, pp. 161127-1-161127-3.

Maik Scheller et al., "Terahertz Quasi Time Domain Spectroscopy", Optics Express, vol. 17, No. 20, Sep. 28, 2009, 11 Pages.

Przemyslaw Jarzab et al., "Interference Aspects of Terahertz Transmission", IEEE, 2009, pp. 1-3.

* cited by examiner

ANTENNA MEASUREMENT SYSTEM AND METHOD

CROSS-REFERENCE TO RELATED APPLICATIONS

The present application claims priority of European patent application 10186549.1 filed on Oct. 5, 2010.

FIELD OF THE INVENTION

The present invention relates to an antenna measurement system for measuring parameters of the transfer function of an antenna transmission system comprising a transmit antenna, a receive antenna and a transmission channel between said transmit antenna and said receive antenna and/or for measuring parameters of an antenna of said antenna transmission system. Further, the present invention relates to a corresponding antenna measurement method.

BACKGROUND OF THE INVENTION

In antenna measurements gating techniques are utilized to reduce the effects of echoic environments on the acquired antenna patterns, as for instance described in J. E. Hansen, Spherical Near-Field Antenna Measurements, London, United Kingdom: Institution of Engineering and Technology/Peter Peregrinus Ltd., 1988 and M. M. Leibfritz et al., "A Comparison of Software- and Hardware-Gating Techniques Applied to Near-Field Antenna Measurements", Advances in Radio Science, Volume 5, pp. 43-48, 2007. Under ideal conditions the transmitting (TX) and receiving (RX) antenna would be positioned in free space or an absorptive box and only the line-of-sight path would contribute to the received signal. In practical measurements the environment surrounding the antennas is never ideal and multipath propagation corrupts the measurement signal. Due to the longer propagation distance, the non-line-of-sight (NLOS) signal components are delayed compared to the line-of-sight (LOS) signal and can thus be gated out in the time domain.

M. D. Blech et al., "Time-Domain Spherical Near-Field Antenna Measurement System Employing a Switched Continuous-Wave Hardware Gating Technique", IEEE Transactions on Instrumentation and Measurement, vol. 59, no. 2, pp. 387-395, February 2010 discloses a time-domain spherical near-field antenna measurement system capable of gating out erroneous signal components, which arise due to multipath propagation in non-ideal anechoic chambers. The developed hardware (HW) gating technique evaluates a switched sinusoidal signal, which is synthesized by an application-specific pulse generator and acquired by either a real-time digitizing oscilloscope or an equivalent-time sampling oscilloscope. The measurement system presented in the above cited article of M. D. Blech et al. has been optimized for acquisition speed, dynamic range, and resolution. Its operating frequency range covers 1.5-8 GHz, and it is applicable to antennas exhibiting a typical 3-dB bandwidth in excess of 400 MHz.

In mm-wave antenna measurements conventional gating techniques like the so called hardware gating, employing RF-switches cannot be used as they suffer from a slow switching speed, a low isolation and a high attenuation. Application specific pulse generators using the concept presented in the above cited article of M. D. Blech et al. cannot be realized as digital building blocks are not available for high frequency ranges as used in mm-wave applications, in particular for frequencies above 1 GHz, preferably above 100 GHz.

Quasi-time domain measurements replacing a vector network analyzer (VNA) as described in K. Shibuya et al., "Compact and Inexpensive Continuous-Wave Subterahertz Imaging System With a Fiber-coupled Multimode Laser Diode", Applied Physical Letters, Appl. Phys. Lett. 90(16), 161127, 2007 are very time consuming as the transfer function of the system needs to be measured for several hundred discrete frequencies over a wide bandwidth and for each of these frequencies there needs to be a variable delay, which usually is realized by a precise linear stage, which must be stepped through all the required positions. So, in total 2n measurements need to be carried out, where n is the number of frequencies, which must be measured in the frequency domain in order to achieve a certain temporal resolution. M. Scheller and M. Koch, "Terahertz Quasi Time Domain Spectroscopy", Optics Express, vol. 17, no. 20, pp. 17723-17733, 2009 describes a method using a multi-mode laser diode, but this technique still suffers from a large number of steps carried out by a linear stage.

BRIEF SUMMARY OF INVENTION

It is an object of the present invention to provide an antenna measurement system and a corresponding method that enable measuring parameters of an antenna of an antenna transmission system and/or parameters of the transfer function (and/or the transient response) of a transmission system consisting of transmit antenna, imperfect channel, and receive antenna for a single discrete frequency at high frequencies as used in mm-wave applications, preferably at frequencies above 1 GHz, in particular above 100 GHz.

According to an aspect of the present invention there is provided an antenna measurement system for measuring parameters of the transfer function of an antenna transmission system comprising a transmit antenna, a receive antenna and a transmission channel between said transmit antenna and said receive antenna and/or for measuring parameters of an antenna of said antenna transmission system, said antenna measurement system comprising

- a radiation source that provides an electromagnetic radiation signal having two spectral lines at different frequencies,
- a first mixer that receives said electromagnetic radiation signal from said radiation source, generates a first mixer signal having spectral lines at the sum and the difference of said spectral lines of said electromagnetic radiation signal, and outputs a first output signal to the transmit antenna having the spectral line of said difference but not the spectral line of said sum, said transmit antenna transmitting a transmit signal over the transmission channel to the receive antenna,
- a pulse generator that generates a pulse signal and provides it to the first mixer for biasing and amplitude modulation of the first output signal,
- a second mixer that receives said electromagnetic radiation signal from said radiation source and a receive signal received by said receive antenna, generates a second mixer signal that corresponds to the first mixer signal and outputs a second output signal, and
- a measurement circuit that measures the current of said second output signal and evaluates said current within a time period corresponding to the line-of-sight signal component has settled and before it is substantially changing to obtain at least one parameter of the transfer function of said antenna transmission system and/or of an antenna of said antenna transmission system.

According to a further aspect of the present invention there is provided a corresponding antenna measurement method.

Preferred embodiments of the invention are defined in the dependent claims. It shall be understood that the claimed antenna measurement method has similar and/or identical preferred embodiments as the claimed antenna measurement system and as defined in the dependent claims.

In order to measure the parameters of the transfer function (and/or transient response) of the transmission system and/or to measure parameters of an antenna of said antenna transmission system for a single discrete frequency, either a time consuming quasi time domain measurement could be carried out (which is not proposed here) or, as proposed here, a switched continuous wave (CW) technique can be employed as generally described in the above cited article of M. D. Blech. Therefore, a switched sine wave signal is preferably applied to the transmit antenna. However, the concept presented in the above cited article of M. D. Blech is not applicable as digital logic circuits are not available for high frequencies, in particular above 100 GHz.

Thus, it is proposed according to the present invention to employ mixers (preferably optical mixers as proposed in preferred embodiments) for frequency conversion on the transmitter side and detection on the receiver side, which are both driven by one or two radiation source units (e.g. including one or more sub-units) providing an electromagnetic radiation signal having two spectral lines at different frequencies (e.g. laser diodes emitting two spectral lines). In this way continuous wave (CW) mm-wave signals can be generated. Applying, as proposed in an embodiment, a switched DC signal for biasing the mixer on the TX side with an ultra-fast rise-time, the envelope of the time domain signal can directly be measured in the time domain on the RX side using, for instance, a sampling oscilloscope.

The envelope of the time domain signal received by the receive antenna is particularly evaluated within a time period when the envelope of the second output signal, that corresponds to the line-of-sight signal component has settled and before it substantially changes again, which substantial change of the envelope is generally caused by the first non-line-of-sight component affecting said second output signal and, hence, said envelope. The steady state signal is corrupted as all signal components, LOS and multiple NLOS signals, are overlaid. From measuring the envelope within this time period at least one parameter of the transfer function of said antenna transmission system and/or at least parameter of an antenna of said antenna transmission system is obtained.

Hence, with the system and method according to the present invention various parameter of an antenna transmission system can be obtained. These parameters include parameters of the transfer function (and/or the transient response) of the antenna transmission system and parameters of the antenna pattern and/or the gain of an antenna under test, i.e. an antenna of said antenna transmission system. In an embodiment for obtaining the antenna pattern, for instance, the transfer function is stepwise acquired by measuring the parameters of the transfer function at various alignments of the antenna under test and then combining the obtained values of the transfer function to said antenna pattern. Similarly, the gain of the antenna under test can be obtained.

Preferably, photo-mixers are applied as said first and second mixers, and the spectral line of said difference of the spectral lines of said electromagnetic radiation signal (which is preferably a signal in the frequency range of visible light) is in the frequency range between 1 GHz and 100 THz, in particular between 30 GHz and 10 THz, i.e. generally is a mm-wave signal. said measurement circuit (20) is operable to measure the low-frequency component of the Preferably, the low frequency component of the current of said second output signal, in particular the DC current of said second output signal, is measured and evaluated by the measurement circuit, which low frequency component is slowly varying.

According to a further aspect the present invention relates to an antenna measurement system for measuring parameters of the transfer function of an antenna transmission system comprising a transmit antenna, a receive antenna and a transmission channel between said transmit antenna and said receive antenna, and/or for measuring parameters of an antenna of said antenna transmission system, said antenna measurement system comprising:

- a radiation emission means for providing an electromagnetic radiation signal having two spectral lines at different frequencies,
- a first mixing means for receiving said electromagnetic radiation signal from said radiation source, generating a first mixer signal having spectral lines at the sum and the difference of said spectral lines of said electromagnetic radiation signal, and outputting a first output signal to the transmit antenna having the spectral line of said difference but not the spectral line of said sum, said transmit antenna transmitting a transmit signal over the transmission channel to the receive antenna,
- a pulse generation means for generating a pulse signal and providing it to the first mixer for biasing and amplitude modulation of the first output signal,
- a second mixing means for receiving said electromagnetic radiation signal from said radiation source and a receive signal received by said receive antenna, generating a second mixer signal that corresponds to the first mixer signal and outputting a second output signal, and
- a measurement means for measuring the current of said second output signal and evaluating said current within a time period when the envelope of the second output signal corresponding to the line-of-sight signal component has settled and before it is substantially changing to obtain at least one parameter of the transfer function of said antenna transmission system and/or of an antenna of said antenna transmission system.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
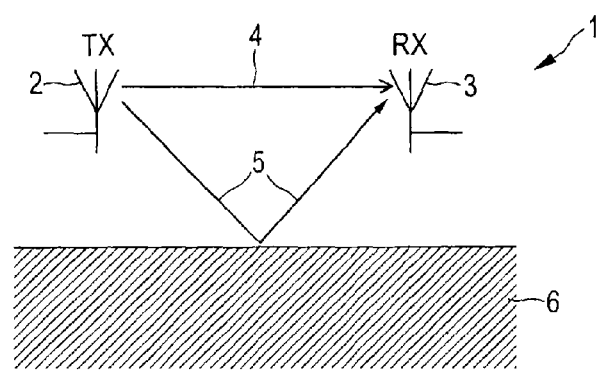
FIG. 1 shows a transmission system having a transmit antenna and a receive antenna to illustrate multi-path propagation.

FIG. 1 generally shows a transmission system 1 having a transmit (TX) antenna 2 and a receive (RX) antenna 3. Further, the propagation of the line-of-sight (LOS) signal 4 and one exemplary non-line-of-sight (NLOS) signal 5 is depicted. The path between the transmit antenna 2 and the receive antenna 3 is generally considered as the transmission channel having a transfer function for transmitting signals over said transmission channel.

Often, in antenna measurements gating techniques are utilized to reduce the effects of echoic (reflective) environments 6 on the acquired antenna patterns. Under ideal conditions the transmit antenna 2 and receive antenna 3 would be positioned in free space or an absorptive box and only the LOS path 4 would contribute to the received signal. In practical measurements the environment surrounding the antennas is never ideal and multipath propagation corrupts the measurement signal. Due to the longer propagation distance, the NLOS signal components are delayed compared to the LOS signal and can thus be gated out in the time domain.

However, in mm-wave applications, in particular using high frequencies above 100 GHz hardware gating cannot be applied as the required hardware, in particular digital logic circuits, is not available for such high frequencies. Quasi-time domain measurements could be applied, but would need a larger number of measurements which would consume much acquisition and processing time.

Figure 2:
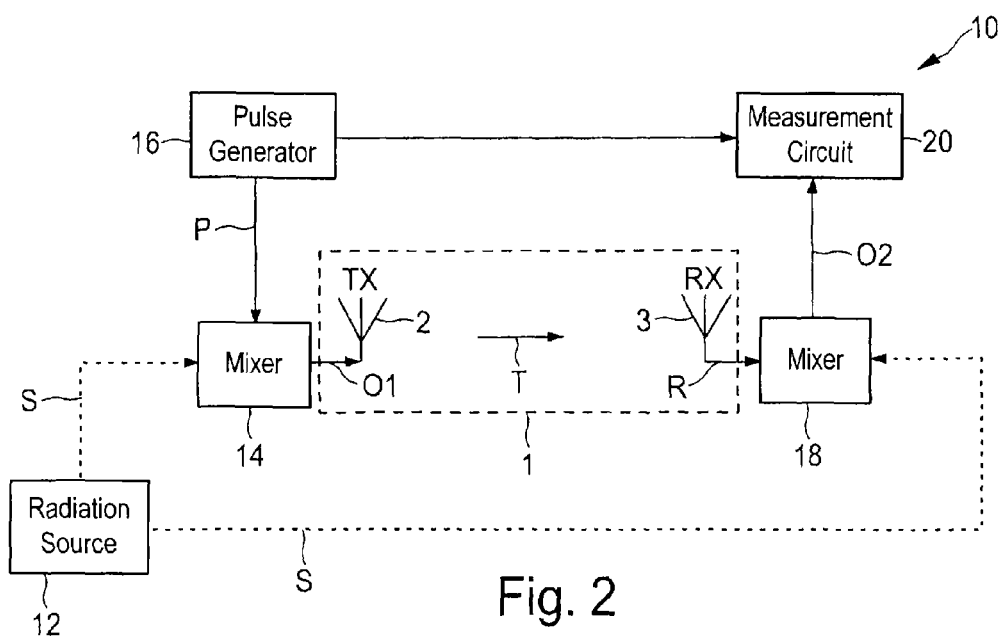
FIG. 2 shows a schematic diagram of the general layout of an antenna measurement system according to the present invention.

In order to measure the antenna pattern, (parameters of) the transfer function and/or (in an alternative, less preferred embodiment) the transient response (in the time domain) of a transmission system 1 for a single discrete frequency an antenna measurement system 10 is proposed as schematically illustrated in FIG. 2. It comprises a radiation source 12 that provides an electromagnetic radiation signal S having two spectral lines at different frequencies in the frequency range between 10 THz and $10^{17}$ Hz, in particular in the frequency range of visible light. The radiation signal S is provided to a first mixer 14 that generates a first mixer signal having spectral lines at the sum and the difference of said spectral lines of said electromagnetic radiation signal, wherein the spectral line of said difference is preferably in the frequency range between 1 GHz and 100 THz, in particular between 10 GHz and 30 THz. The first mixer 14 outputs a first output signal O1 to the transmit antenna 2 having the spectral line of said difference but not the spectral line of said sum. The transmit antenna then transmits a transmit signal T over the transmission channel to the receive antenna 3. A pulse generator 16 is provided that generates a pulse signal P and provides it to the first mixer 12 for biasing and amplitude modulation of the first output signal O1.

The radiation signal S emitted from the radiation source 12 is further provided to a second mixer 18. The second mixer 18 further receives a receive signal R received by said receive antenna 3, generates a second mixer signal that corresponds to the first mixer signal and outputs a second output signal O2. A measurement circuit 20 is provided that measures the current, preferably the low frequency component or the DC current, of said second output signal O2 and evaluates said current within a time period when the envelope of the second output signal has settled and before it is substantially changing, generally caused by the first non-line-of-sight component affecting said second output signal and, hence, said envelope, to obtain at least one parameter of the transfer function of said antenna transmission system 1.

Preferably, the mixers 14 and 18 are identical, but they need not necessarily to be identical. Their frequency response can be different, but they need to cover the same frequency range.

Figure 3:
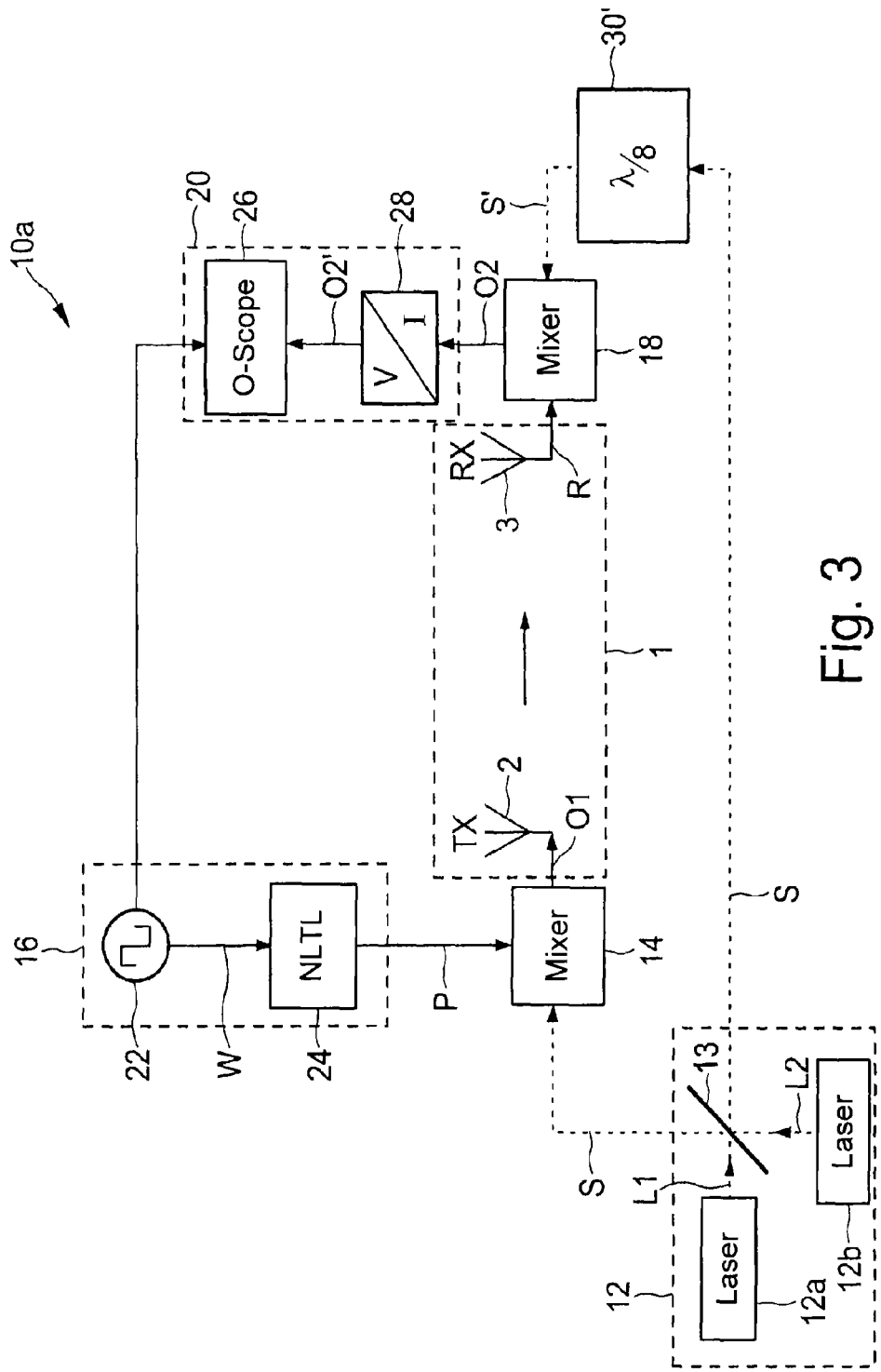
FIG. 3 shows a schematic diagram of a first embodiment of an antenna measurement system according to the present invention.

In a preferred embodiment of the antenna measurement system 10a, as schematically illustrated in FIG. 3, the two mixers 14, 18 are optical mixers. The mixers are illuminated by two monochromatic lasers 12a, 12b (as shown in FIG. 3) or a single dual-mode laser (e.g. only laser 12a as a dual-mode laser, but no second laser 12b; not shown), respectively. Further, a coupling element 13, in particular a beam splitter or semitransparent mirror for coupling said laser signals L1, L2 issued by the lasers 12a, 12b together into said electromagnetic radiation signal S, is provided. The first mixer 14 generates the sum and the difference frequency ($f_1+f_2$ and $f_1-f_2$) of the two optical frequencies (called the first mixer signal above). The difference frequency lies in the mm-wave range (preferably in the range from 30 GHz to 10 THz) and is output to the transmit antenna 2 as first output signal O1, whereas the sum frequency is directly filtered by the low pass characteristic of the first mixer 14 itself.

In order to bias the first mixer 14 properly, a DC voltage signal is preferably applied. With this bias an amplitude modulation of the mm-wave signal (i.e. the first output signal O1) can be carried out. In order to generate a switched continuous wave (CW) signal as required for the known gating technique, the switched bias preferably has a rise time in the order of a few hundred picoseconds. Depending on the distance to the closest obstacle, there is a time delay of the non-line-of-sight (NLOS) signal components compared to the line-of-sight (LOS) signal.

Figure 4:
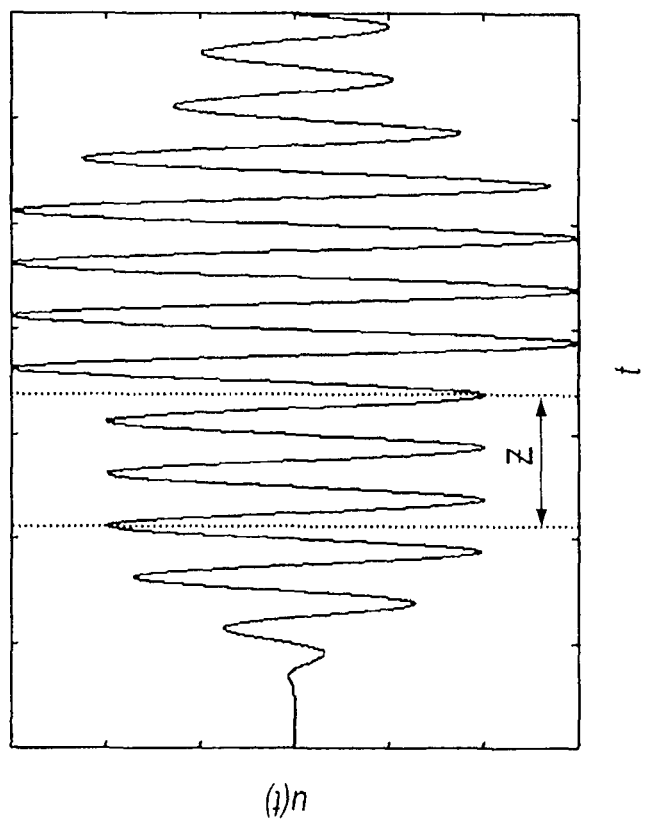
FIG. 4 shows a diagram illustrating an output signal of the proposed antenna measurement system.

A possible mm-wave signal on the receiver side, i.e. the receive signal R, is depicted in FIG. 4. The distortion free signal must measured within the period Z when the envelope of the switched CW signal has settled (corresponding to the LOS signal) and before the first multipath (NLOS) component affects the signal, i.e. before the envelope substantially changes compared to the previously settled state.

In an embodiment the start time of this period Z is roughly calculated from the geometry of the setup. The length of the LOS path plus some guard interval provides the time delay from which the signal is evaluated. The stop time is computed by taking a value shorter than the shortest NLOS path delay. However, other embodiments for determining the period Z, in particular its start time, exist. For instance, the first settled state can be monitored, e.g. by means of digital signal processing, or the start time can be estimated from previous measurements.

For generating a rise time in the order of picoseconds a square wave generator 22 and a subsequent nonlinear transmission line (NLTL) 24 are preferably used. The nonlinear transmission line 24 enhances the rise time of the edge of the square wave signal W of the pulse generator 22.

On the receiver side, the current through the second mixer 18, in particular the DC current, is measured using, e.g., a digitizing oscilloscope 26. Before, the output signal O2 of the second mixer 18, i.e. the output current, is converted into an output voltage signal O2' by use of a current-to-voltage converter 28. For instance, the DC voltage could be measured over a resistor, which is proportional to the current as well as the amplitude of the envelope of the received mm-wave signal R.

In an embodiment, the digitizing of the measurement signal, output voltage O2 of the second mixer 18 or the output current O2' is carried out over multiple of periods and averaged. This enhances the signal-to-noise ratio (SNR).

The mixers 14, 18 (e.g. photo-mixers made of low temperature grown gallium arsenide (LT-GaAs)) generally have a low pass characteristic. Thus, the sum of the two (optical) frequencies is generally filtered out. The remaining difference is in the mm-wave range and can be named $f_{mm}$. On the receiver side this signal is generated as well as on the transmitter side, but it is mixed with the received $f_{mm}$ (homodyne mixing) and the mixer output signal comprises a DC component and a component at $2f_{mm}$ (see $\cos(\omega_{mm}t)=\frac{1}{2}+\frac{1}{2}*\cos(2\omega_{mm}t)$). This means that additional low-pass filtering is necessary in order to remove the component $2f_{mm}$. This is normally done by the measurement unit (e.g. the oscilloscope 26 or an AD converter) automatically as it does not have such a high input bandwidth. In case no instrument is available, which can handle $f_{mm}$, either an analog low pass filter can be used at the output of the second mixer 18 or this signal component can be removed by digital signal processing of the data recorded by the instrument.

In order to obtain the amplitude of the received signal R, the amplitude and the phase of the mm-wave signal should be resolved correctly. Therefore, in an embodiment a delay unit 30' (in particular a variable optical delay unit) is provided. Inducing a phase difference of $\lambda/4$ or $\lambda/8$ to one of the (optical) feeds of the two mixers 14, 18 (in the embodiment shown in FIG. 3 a phase difference of $\lambda/8$ to input of the radiation signal S to the second mixer 18 resulting in a delayed radiation signal S'), where $\lambda$ is the wavelength of the mm-wave signal in free space, allows the determination of the amplitude $$|H(f)| \sim \sqrt{I_0^2(f)+I_1^2(f)} \tag{1}$$

and the phase $$\arg\{H(f)\} \sim \arctan\left(\frac{I_0(f)}{I_1(f)}\right) \tag{2}$$

of the frequency dependent transfer function H(f) of the transmission system 1. In Eq. (1) and (2) $I_0(f)$ and $I_1(f)$ are the measured amplitudes of the DC current through the second mixer 18 the different delays $d_0$ and $d_1$, where $d_1-d_0=\lambda/8$ or $\lambda/4$, respectively.

With respect to the variable delay it shall be noted that in principle only one of the two laser signals L1, L2 focused on the second mixer 18 has to be shifted by $\lambda/4$, which requires an additional beam splitter; thus it is more practical to shift both laser signals L1, L2 (i.e. the output signals of both lasers 12a, 12b combined in to the radiation signal S) by only $\lambda/8$ as shown in FIG. 3.

The variable delay unit 30' is not required for amplitude only measurements (in particular antenna far-field measurements), if and only if it can be assured that the antenna under test is rotated around its phase center. In many situations, this can not be assured, so the actual amplitude is preferably obtained by means of homodyne IQ mixing, where the variable delay unit 30' is required in order to shift the signal inputs to the second mixer 18 by 90° (in particular, as mentioned above, by $\lambda/8$ for shifting both signal inputs or by $\lambda/4$ for shifting only one of them).

In case of antenna near-field measurements the delay circuit is necessary in order to obtain the amplitude and phase by means of homodyne mixing, which provides the I and Q component of the receive signal R, if the signal inputs to the second mixer 18 are shifted by 90° as explained above.

In more general, in an embodiment delay circuit 18 is provided which is coupled between the radiation source 12 and either the first mixer 14 or the second mixer 18 for delaying said electromagnetic radiation signal S by a first delay value, in particular by zero, for a first measurement of the current and by a second delay value, which is by $\lambda/4$ smaller or larger than the first delay value, for a second measurement of the current. In this embodiment the measurement circuit 20 is operable to perform said first measurement and said second measurement of said current of said second output signal and obtain said at least one parameter of the transfer function of said antenna transmission system 1 from said first and second measurements.

In a further embodiment, for the determination of the gain of the antenna under test (AUT), first a calibration using one well-known antenna is done. After replacing this standard gain antenna by the AUT, the pattern and the gain auf the AUT can be determined according to the well-established 2-antenna method as described in IEEE Standard 149-1979, IEEE Standard Test Procedures for Antennas, New York, N.Y., USA: Institute of Electrical and Electronics Engineers, 1979. Alternatively three unknown antennas can be measured. This procedure is called 3-antenna method as also described in this document. The descriptions of these methods provided in this document are herewith incorporated by reference.

Employing the 2-antenna method, the gain of the AUT $G_{AUT}(f)$ can be calculated from the measured transfer functions $H_{ref}(f, \theta_{main}, \phi_{main})$ of the system comprising of the standard gain antenna, its gain $G_{ref}(f)$, and $H_{AUT}(f, \theta_{main}, \phi_{main})$ of the system using the AUT in main beam direction $$G_{AUT,dB}(f)=G_{ref,dB}(f)+H_{AUT,dB}(f,\theta_{main},\phi_{main})-H_{ref,dB}(f,\theta_{main},\phi_{main}). \tag{3}$$

The angular dependent pattern of the AUT is obtained by measuring the frequency response of the AUT in different directions $$C_{AUT,dB}(f,\theta,\phi)=G_{ref,dB}(f)+H_{AUT,dB}(f,\theta,\phi)-H_{ref,dB}(f,\theta_{main},\phi_{main}). \tag{4}$$

In order to apply the switched CW gating technique to near-field measurements, as e.g. described in J. E. Hansen, Spherical Near-Field Antenna Measurements, London, United Kingdom: Institution of Engineering and Technology/Peter Peregrinus Ltd., 1988, the phase $\arg\{H(f)\}$ is also valuated. Once amplitude and phase of the receive signal are known on a surface (e.g. planar, cylindrical, or spherical), the measured field can be transformed to an arbitrary distance within the near-field region or in the far-field. Using the near-field to far-field transformation technique, the distance between the transmit antenna and the antenna can be kept much smaller than for conventional far-field measurements. Furthermore, the antenna can be measured e.g. directly on chip in a multipath environment (no anechoic chamber is needed). Compared to far-field measurements the RX signal levels are much higher, which ensures a high dynamic range of the measurement.

In traditional far-field measurement only the amplitude is measured at a large distance from the antenna. The measured values only apply in high distances and no estimation can be made how the field may look like in close vicinity of the antenna. It is a well-known technique, where amplitude and phase on a surface around an antenna are measured. From this data the field at any distance can be computed (closer or farther away than the measurement distance). The main difference between conventional near-field and far-field measurement is that in far-field measurements it is only needed to measure amplitude whereas in near-field measurements both amplitude and phase generally need to be measured, although in the meantime there are also phaseless near-field measurement techniques available. In embodiments of the present invention, in which a homodyne IQ mixing is applied by using a delay circuit, the amplitude and the phase can be computed. In theory this scheme can be simplified for far-field measurements, but as it is difficult in practice to turn the antenna under test around its phase center, also in far-field measurements two measurements with a delay are preferably carried out.

Figure 5:
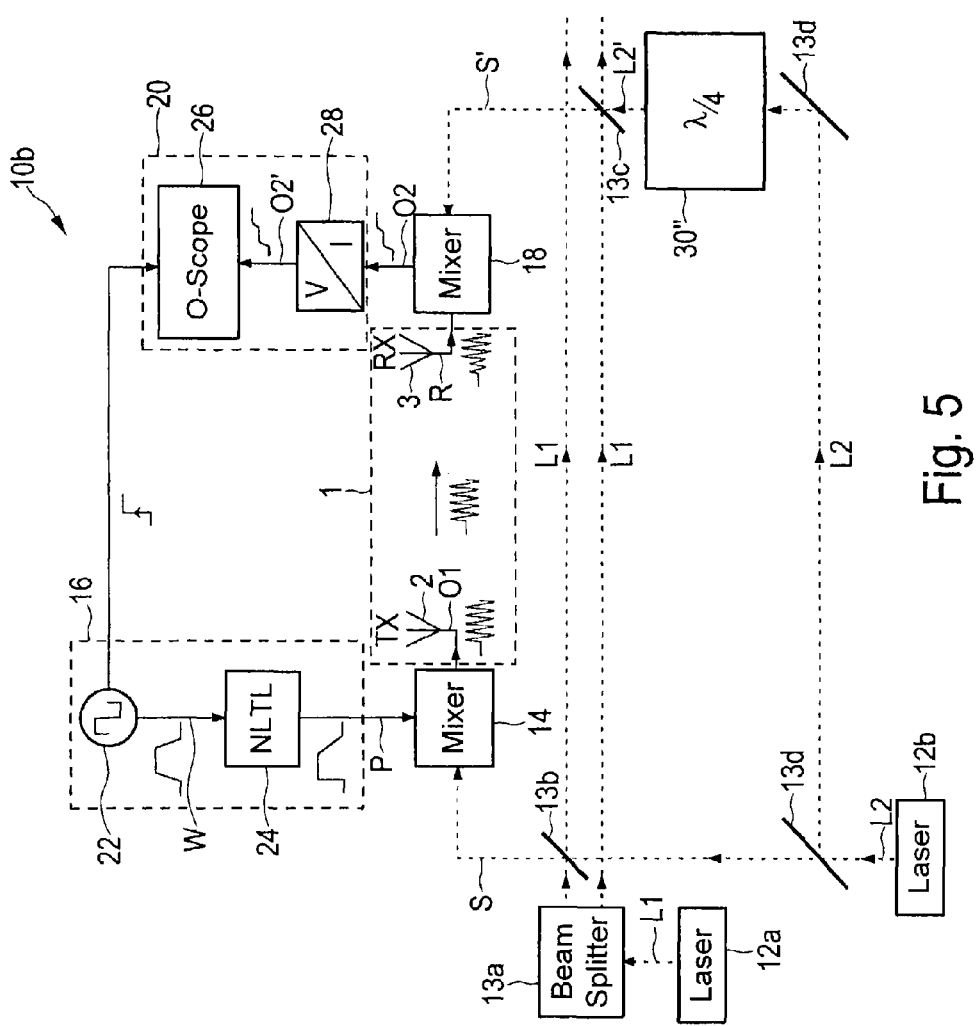
FIG. 5 shows a schematic diagram of a second embodiment of an antenna measurement system according to the present invention.

FIG. 5 shows a schematic diagram of a second embodiment of an antenna measurement system 10b according to the present invention. To a large extent this embodiment is similar or identical to the embodiment of the antenna measurement system 10a shown in FIG. 3. Hence, like elements are provided with like reference numbers. In addition, for illustrative purposes, typical signals have been depicted at various positions in the system.

A difference, however, exists in the generation and distribution of the radiation signal S to the mixers 14 and 18. Like in the embodiment shown in FIG. 3 two monochromatic lasers or laser diodes 12a, 12b are used. The generated laser signals L1, L2 are coupled together by a beam splitter 13a, beam splitters or semi-transparent mirrors 13b, 13c, 13e and a mirror 13d as shown in FIG. 5. Between the coupling element 13d and the coupling element 13c a delay circuit 30", in particular a variable optical delay circuit, is arranged for delaying the laser signal L2 of the second laser 12b by a delay of $\lambda/4$, before this delayed signal L2' is combined with the undelayed laser signal L1 of the first laser 12a into the delayed radiation signal S' provided to the second mixer. Hence, at the input of the first mixer 14 a combination of the laser signals L1 and L2 is provided and at the input of the second mixer 18 a combination of the laser signal L1 and the delayed laser signal L2' is provided.

Figure 6:
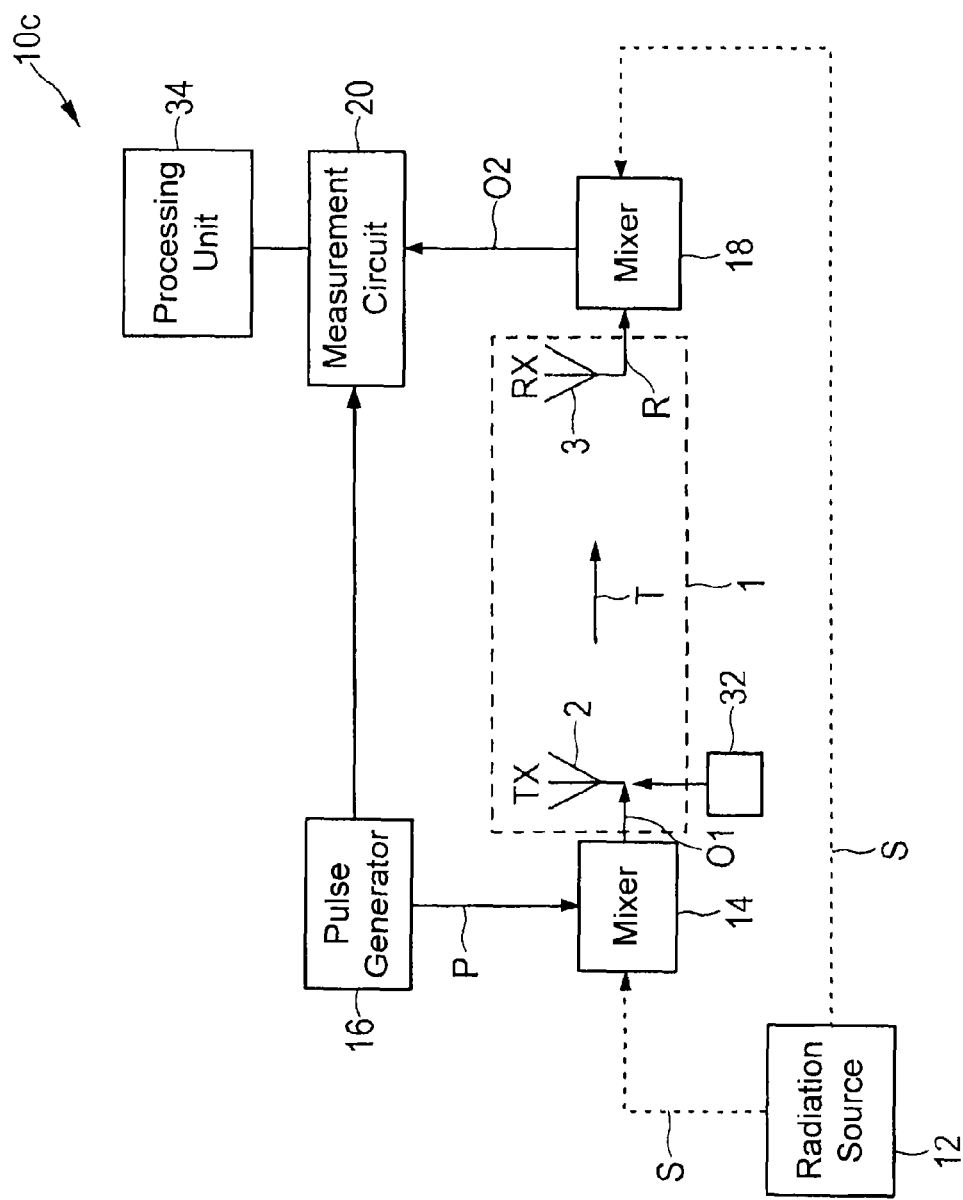
FIG. 6 shows a schematic diagram of a third embodiment of an antenna measurement system according to the present invention.

FIG. 6 shows a schematic diagram of a third embodiment of an antenna measurement system 10c according to the present invention. Compared to the previously described embodiments, according to this embodiment additional antenna movement means 32 for varying the position, in particular the orientation, of one of the antennas of the antenna transmission system 1—here of the transmit antenna 2 which shall be considered as the antenna under test—is provided. These antenna movement means 32 may comprise a turntable or other mechanical movement means, by which the position and/or the orientation of the transmit and/or receive antenna can be changed depending on the scanning profile (planar, cylindrical, or spherical). In case of moving or turning one of the antennas, it might be necessary to employ an optical fiber to guide the optical wave to the corresponding photo-mixer.

To obtain the antenna pattern of the transmit antenna 2 with this embodiment, the above described measurement of the transfer function is performed a plurality of times for various orientations of the transmit antenna 2. The obtained values of the transfer function of the antenna transmission system for said various orientations are then combined in a known manner, e.g. as briefly explained above, to finally obtain the antenna pattern of the transmit antenna. For this purpose a processing unit 34 is provided.

In far-field measurements the amplitude values on a spherical surface or particularly on a polar cut around the antenna under test are measured at discrete positions and combined to a plot in a post processing step. In near-field measurements the amplitude and phase on a grid lying on a plane, a cylinder, or a sphere around the antenna under test are measured and used for computing the far-field pattern of the antenna (or another near-field pattern at a different distance).

By use of the present invention antenna measurements can be carried out in echoic/multipath environment, as e.g. the characterization of a chip antenna directly on the waver which is positioned on the chuck of a probe station. This means that an on-chip antenna does not necessarily need to be assembled to a module, which is then taken to an anechoic antenna measurement test site. This saves a lot of time and cost, especially in a mass production, if each antenna needs a final test measurement.

Compared to the quasi time domain approach, the switched continuous wave setup reduces the measurement time dramatically as only two measurements with two different optical delays separated by $\lambda/4$ are needed. In a quasi time domain measurement setup, in contrast, 2n measurements are needed, where n stands for the number of discrete measurement frequencies to be measured. Further, compared to quasi time domain measurements no expensive tunable laser is needed. For a specific mm-wave measurement frequency two laser diodes emitting a fixed spectral line can be used in the setup.

Using optical mixers, a wider frequency range in the sub-terahertz spectrum can be covered compared to a conventional switched CW antenna measurement, which is limited to approximately 200 GHz. Further, the mm-wave signal can be generated more easily and at much lower cost compared to a conventional T/R module of a VNA measurement.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Antenna measurement system for measuring parameters of the transfer function of an antenna transmission system comprising a transmit antenna, a receive antenna and a transmission channel between said transmit antenna and said receive antenna, and/or for measuring parameters of an antenna of said antenna transmission system, said antenna measurement system comprising:

a radiation source that provides an electromagnetic radiation signal having two spectral lines at different frequencies, a first mixer that receives said electromagnetic radiation signal from said radiation source, generates a first mixer signal having spectral lines at the sum and the difference of said spectral lines of said electromagnetic radiation signal, and outputs a first output signal to the transmit antenna having the spectral line of said difference but not the spectral line of said sum, said transmit antenna transmitting a transmit signal over the transmission channel to the receive antenna, a pulse generator that generates a pulse signal and provides it to the first mixer for biasing and amplitude modulation of the first output signal, a second mixer that receives said electromagnetic radiation signal from said radiation source and a receive signal received by said receive antenna, generates a second mixer signal that corresponds to the first mixer signal and outputs a second output signal, and a measurement circuit that measures a current of said second output signal and evaluates said current within a time period when the envelope of the second output signal corresponding to a line-of-sight signal component has settled and before it is substantially changing to obtain at least one parameter of the transfer function of said antenna transmission system and/or of an antenna of said antenna transmission system.

2. Antenna measurement system as claimed in claim 1, wherein said measurement circuit is operable to obtain amplitude or phase of said transfer function and/or gain of said transmit antenna or of said receive antenna.

3. Antenna measurement system as claimed in claim 1, further comprising a current-to-voltage converter for converting the current of said second output signal into a voltage signal, in particular a DC voltage signal, for evaluation and obtaining the one or more parameters of the transfer function.

4. Antenna measurement system as claimed in claim 1, further comprising a delay circuit coupled between the radiation source and either the first mixer and/or the second mixer for delaying said electromagnetic radiation signal by a first delay value, in particular by zero, for a first measurement of the current and by a second delay value, which is by $\lambda/8$ or $\lambda/4$ smaller or larger than the first delay value, for a second measurement of the current, wherein $\lambda$ is the wavelength of an optical signal in free space, wherein said measurement circuit is operable to perform said first measurement and said second measurement of said current of said second output signal and obtain said at least one parameter of the transfer function of said antenna transmission system from first and second measurements.

5. Antenna measurement system as claimed in claim 4, wherein said measurement circuit (20) is operable to determine the amplitude of the transfer function by $|H(f)| \sim \sqrt{I_0^2(f) + I_1^2(f)}$ and/or to determine the phase of the transfer function by $$\arg\{H(f)\} \sim \arctan\left(\frac{I_0(f)}{I_1(f)}\right),$$

wherein $I_0(f)$ and $I_1(f)$ are measured amplitudes of the current for the different delay values.

6. Antenna measurement system as claimed in claim 1, wherein said measurement circuit is operable to determine the gain of said transmit antenna and/or of said receive antenna by a known two-antenna method, wherein a first calibration measurement is performed using a calibration antenna having known parameters and wherein a second gain measurement is performed with the calibration antenna replaced by the antenna, whose gain is to be measured.

7. Antenna measurement system as claimed in claim 1, wherein said measurement circuit is operable to determine the gain of said transmit antenna and/or of said receive antenna by a known three-antenna method, wherein three calibration measurements are performed using three antennas having unknown parameters.

8. Antenna measurement system as claimed in claim 1, wherein said radiation source is operable to provide an electromagnetic radiation signal having two spectral lines at different frequencies in the frequency range between 10 THz and $10^{17}$ Hz, in particular in the frequency range of visible light.

9. Antenna measurement system as claimed in claim 1, wherein said radiation source comprises two monochromatic laser units each providing a laser signal having substantially a single spectral line at different frequencies and a coupling element, in particular a beam splitter or semi-transparent mirror, for coupling said laser signals together into said electromagnetic radiation signal.

10. Antenna measurement system as claimed in claim 1, wherein said radiation source comprise a single dual-mode laser unit providing said electromagnetic radiation signal.

11. Antenna measurement system as claimed in claim 1, wherein said first mixer and said second mixer are photomixers that generate the first mixer signal and the second mixer signal, respectively, wherein the spectral line of said difference of the spectral lines of said electromagnetic radiation signal is in the frequency range between 1 GHz and 100 THz, in particular between 30 GHz and 10 THz.

12. Antenna measurement system as claimed in claim 1, wherein said pulse generator comprises a square wave generator and a non-linear transmission line that generate said pulse signal, in particular exhibiting a rise-time in the order of picoseconds.

13. Antenna measurement system as claimed in claim 12, wherein said square wave generator is coupled to said measurement circuit for providing its square wave signal to the measurement circuit for synchronization of the timing between said pulse generator and said measurement circuit.

14. Antenna measurement system as claimed in claim 1, wherein said measurement circuit is operable to measure a low-frequency component of the current of said second output signal, in particular the DC current of said second output signal, and to evaluate said low-frequency component, in particular said DC current.

15. Antenna measurement system as claimed in claim 1, wherein said first mixer is operable to generate a first mixer signal, in which the spectral line at the difference of said spectral lines is in the frequency range between 1 GHz and 100 THz, in particular between 10 GHz and 30 THz.

16. Antenna measurement system as claimed in claim 1, further comprising an antenna movement means for varying a position, in particular an orientation, of one of the antennas of the antenna transmission system and a processing unit that processes parameters of the transfer function obtained for different positions, in particular different orientations, of said antenna to obtain the antenna pattern and/or gain of said antenna.

17. Antenna measurement method for measuring parameters of the transfer function of an antenna transmission system comprising a transmit antenna, a receive antenna and a transmission channel between said transmit antenna and said receive antenna and/or for measuring parameters of an antenna of said antenna transmission system, said antenna measurement method comprising the steps of:

providing an electromagnetic radiation signal having two spectral lines at different frequencies, generating a first mixer signal having spectral lines at the sum and the difference of said spectral lines of said electromagnetic radiation signal, outputting a first output signal to the transmit antenna having the spectral line of said difference but not the spectral line of said sum, transmitting a transmit signal by said transmit antenna over the transmission channel to the receive antenna, generating a pulse signal for biasing and amplitude modulation of the first output signal, generating a second mixer signal that corresponds to the first mixer signal by use of said electromagnetic radiation signal and a receive signal received by said receive antenna, outputting a second output signal, measuring a current of said second output signal, and evaluating said current within a time period when the envelope of the second output signal corresponding to a line-of-sight signal component has settled and before it is substantially changing to obtain at least one parameter of the transfer function of said antenna transmission system and/or of an antenna of said antenna transmission system.

18. Antenna measurement system for measuring parameters of the transfer function of an antenna transmission system comprising a transmit antenna, a receive antenna and a transmission channel between said transmit antenna and said receive antenna, and/or for measuring parameters of an antenna of said antenna transmission system, said antenna measurement system comprising:

a radiation emission means for providing an electromagnetic radiation signal having two spectral lines at different frequencies, a first mixer means for receiving said electromagnetic radiation signal from said radiation source, generating a first mixer signal having spectral lines at the sum and the difference of said spectral lines of said electromagnetic radiation signal, and outputting a first output signal to the transmit antenna having the spectral line of said difference but not the spectral line of said sum, said transmit antenna transmitting a transmit signal over the transmission channel to the receive antenna, a pulse generation means for generating a pulse signal and providing it to the first mixer for biasing and amplitude modulation of the first output signal, a second mixer means for receiving said electromagnetic radiation signal from said radiation source and a receive signal received by said receive antenna, generating a second mixer signal that corresponds to a first mixer signal and outputting a second output signal, and a measurement means for measuring a current of said second output signal and evaluating said current within a time period when the envelope of the second output signal corresponding to a line-of-sight signal component has settled and before it is substantially changing to obtain at least one parameter of the transfer function of said antenna transmission system and/or of an antenna of said antenna transmission system.

* * * * *